(12) United States Patent
Borthakur et al.

(10) Patent No.: US 7,987,181 B2
(45) Date of Patent: Jul. 26, 2011

(54) SYSTEM AND METHOD FOR DIRECTING QUERY TRAFFIC

(75) Inventors: Dhrubajyoti Borthakur, San Jose, CA (US); Nur Premo, San Jose, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1182 days.

(21) Appl. No.: 10/869,722

(22) Filed: Jun. 16, 2004

(65) Prior Publication Data

US 2006/0004710 A1    Jan. 5, 2006

(51) Int. Cl.
G06F 17/30    (2006.01)
(52) U.S. Cl. ........................................................ 707/719
(58) Field of Classification Search .................. 707/1, 2, 707/3, 10; 709/209, 522
See application file for complete search history.

(56) References Cited

U.S. PATENT DOCUMENTS

| | | | |
|---|---|---|---|
| 6,205,477 B1 | 3/2001 | Johnson et al. | |
| 6,353,818 B1 * | 3/2002 | Carino, Jr. ............................ 1/1 |
| 6,792,577 B1 * | 9/2004 | Kimoto ........................ 715/522 |
| 6,807,667 B1 * | 10/2004 | Bar et al. ...................... 719/320 |
| 6,850,482 B1 | 2/2005 | Ashdown et al. | |
| 6,954,456 B2 * | 10/2005 | Cranor et al. ................. 370/356 |
| 7,096,263 B2 | 8/2006 | Leighton et al. | |
| 7,111,061 B2 * | 9/2006 | Leighton et al. .............. 709/224 |
| 7,136,922 B2 | 11/2006 | Sundaram et al. | |
| 7,376,752 B1 * | 5/2008 | Chudnovsky et al. ........ 709/245 |
| 2003/0014539 A1 | 1/2003 | Reznick | |
| 2003/0093556 A1 * | 5/2003 | Yeung et al. .................. 709/238 |
| 2003/0115065 A1 * | 6/2003 | Kakivaya et al. ........... 704/270.1 |
| 2003/0126136 A1 * | 7/2003 | Omoigui ......................... 707/10 |
| 2003/0151633 A1 * | 8/2003 | George et al. ................. 345/864 |
| 2003/0212664 A1 * | 11/2003 | Breining et al. .................. 707/3 |
| 2003/0229809 A1 | 12/2003 | Wexler et al. | |
| 2004/0186897 A1 * | 9/2004 | Knauerhase et al. ......... 709/209 |
| 2005/0027882 A1 | 2/2005 | Sullivan et al. | |

OTHER PUBLICATIONS

Bukauskas, Linas et al., "Query Load Balancing for Incremental Visible Object Extraction", 2004, IEEE, International Database Engineering and Applications Symposium (IDEAS '04), pp. 1-10.*
Shafer, "F5 Enters Deep Packet Fray," Oct. 21, 2002, downloaded from http://web.archive.org/web/20030808231506/http://www.f5.com/f5/news/articles/article102102B.html, 2 pages.

* cited by examiner

*Primary Examiner* — Neveen Abel-Jalil
*Assistant Examiner* — Farhan M Syed
(74) *Attorney, Agent, or Firm* — Rory D. Rankin; Meyertons, Hood, Kivlin, Kowert & Goetzel, P.C.

(57) ABSTRACT

A system and method for directing query traffic. In one embodiment, the system may include a plurality of query servers, each configured to evaluate queries, and a query traffic director. The query traffic director may be configured to receive a given query formulated in a query language for evaluation, to parse the given query, to identify a dataset targeted by the given query dependent upon parsing the given query, and to convey the given query to a particular query server dependent upon the identified dataset.

23 Claims, 3 Drawing Sheets

SYSTEM AND METHOD FOR DIRECTING QUERY TRAFFIC

BACKGROUND OF THE INVENTION

1. Field of the Invention

This invention relates to computer systems and, more particularly, to query systems.

2. Description of the Related Art

Computer systems are often configured to process large quantities of information stored in databases. For example, commercial enterprises may collect and maintain numerous data items pertaining to customers, suppliers, regulatory agencies, internal business processes, and many other entities. Such data may include contact information, financial data, inventory, production schedules, and other data of interest. To manipulate and extract such data, a computer system configured to implement database functionality such as query evaluation may be provisioned.

As both the quantity of data being managed by a given database and user demand for database services grow, multiple computer systems may be provisioned to share the burden of managing data and responding to user query requests. For example, in one embodiment a database may be partitioned among several server computer systems, such that each system stores a unique portion of the database. In such an embodiment, query requests may be received and allocated to the computer systems in a round-robin fashion, without regard to the content of the requests. However, if the database is partitioned, a given server may receive a query that requests data that is not in the unique portion of the database stored on that given server. Consequently, the query may need to be forwarded to a server that does possess the requested data, which may incur processing and network propagation delay that may generally slow the processing of that query.

Additionally, in some embodiments the provisioned server systems may not be equivalent in their processing resources, such that sending a query to a given server without accounting for query complexity may result in suboptimal use of server resources. For example, the round-robin algorithm might result in sending a complex query to a slower server while a faster server remains idle.

SUMMARY OF THE INVENTION

Various embodiments of a system and method for directing query traffic are disclosed. In one embodiment, the system may include a plurality of query servers, each configured to evaluate queries, and a query traffic director. The query traffic director may be configured to receive a given query formulated in a query language for evaluation, to parse the given query, to identify a dataset targeted by the given query dependent upon parsing the given query, and to convey the given query to a particular query server dependent upon the identified dataset.

In one specific implementation of the system, the query traffic director may be further configured to estimate complexity of the given query, and to select a given query server dependent upon the estimated complexity. In another specific implementation of the system, the query traffic director may be further configured to select a given query server dependent on an indication of availability of the given query server.

A method is also contemplated which, in one embodiment, may include a query traffic director receiving a given query formulated in a query language for evaluation, the query traffic director parsing the given query, the query traffic director identifying a dataset targeted by the given query dependent upon parsing the given query, and the query traffic director conveying the given query to a particular one of a plurality of query servers dependent upon the identified dataset, where each of the query servers is configured to evaluate queries.

Figure 1:
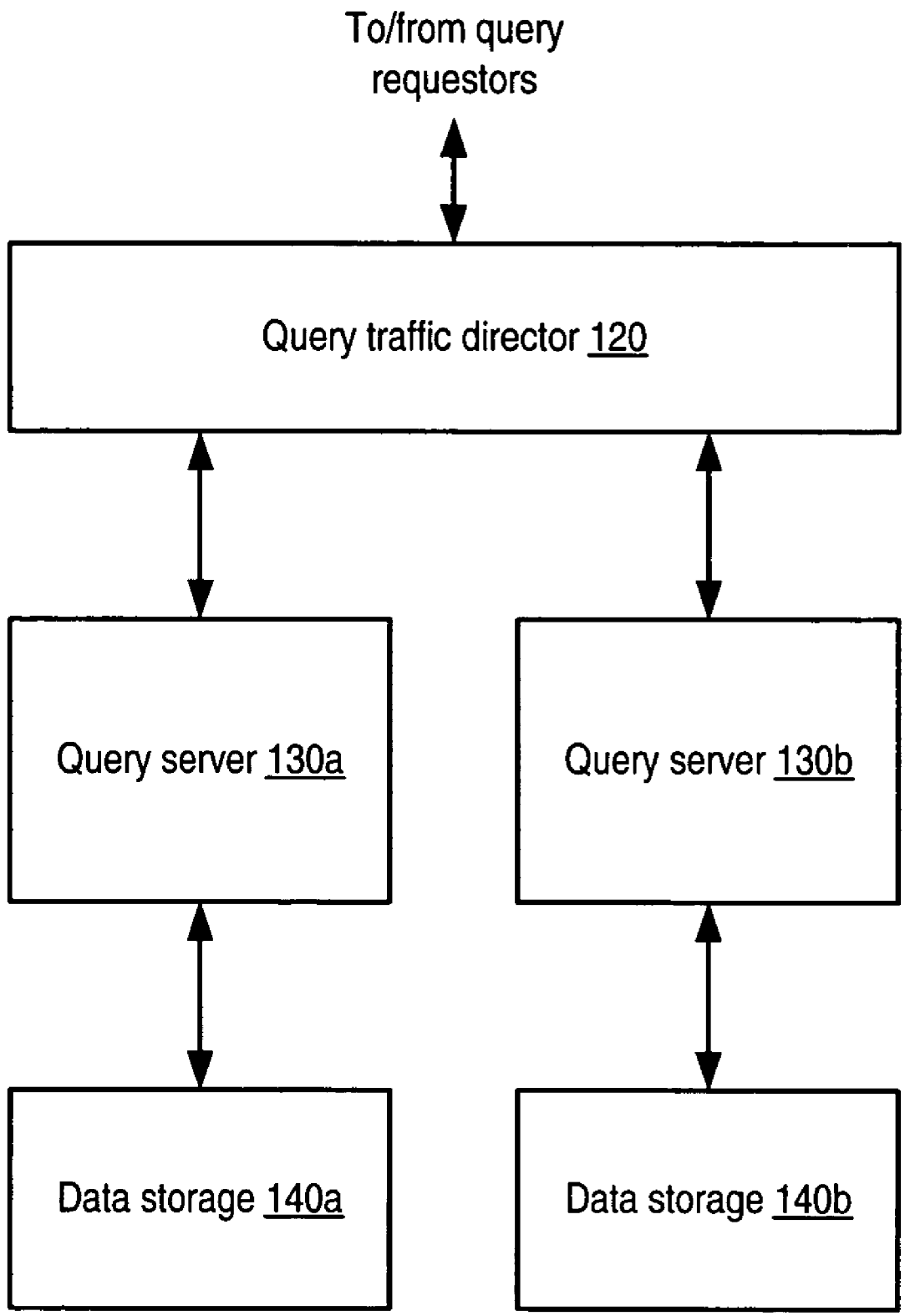
FIG. 1 is a block diagram illustrating one embodiment of a system configured to direct query traffic.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

In typical database systems, a structure for organizing a collection of data is defined, and the collection of data is stored according to that structure. For example, in one embodiment data may be organized into tables including rows and columns that are assigned types or meanings based on their relative position within a table. In another embodiment, data may be formatted using a markup language, for example Extensible Markup Language (XML), which provides labels or "tags" that may be used to explicitly denote a particular type or class of data. Explicitly tagging data fields of interest may require more overall data storage capacity than an implicit structure such as a table, but may also enable data to be more easily extended or manipulated since tagged data items generally are not semantically dependent on the relative positions of other data items.

Once stored according to some structure, data within a database may be selected according to a query. For example, a user may submit a query to select only those stored data items or records that satisfy a set of criteria, such as matching a particular text string or having a numerical value within a specified range. In many embodiments, queries may be specified in a query language that defines a particular syntax for formulating a query. Some exemplary query languages may include XML Query (XQuery) and Structured Query Language (SQL), although numerous other types and variants of query languages are possible and contemplated. In some embodiments, a query may be generated and submitted interactively by a user via an application or process running on a computer system, whereas in other embodiments queries may be generated and submitted for evaluation by an application or process directly.

In some embodiments, a query may be evaluated on a computer system distinct from the system from which the query was submitted. For example, a particular computer system may be configured to implement database and query functionality on behalf of several other systems, which may submit queries via a local area network (LAN), the Internet, or other means. A computer system configured to receive queries, evaluate them, and return corresponding data may be referred to herein as a query server.

As the volume of query traffic and the quantity of data stored in a database increase, in some embodiments the database may be partitioned onto multiple query servers to maintain a desired level of service. In one embodiment, partitioning a database may include dividing the stored data into portions or "datasets" and storing each dataset on a data storage device associated with a respective query server. (Each dataset may also be said to be stored on a respective query server, it being understood that the dataset may actually be stored on one or more devices within, connected to, or otherwise associated with the query server.) In such an embodiment, whether a given query server participates in the evaluation of a given query may depend on whether the given query references a dataset stored on the given query server. If a given query is received by a query server that does not store a dataset relevant to the query, a delay may occur while an appropriate query server is identified and the given query is sent to the identified server, potentially degrading query processing performance.

If multiple query servers with respective datasets are provided in a system, received queries may be directed to a particular query server according to a query traffic direction algorithm that may attempt to minimize the inefficiency of sending a query to an inappropriate server. One embodiment of a system configured to direct query traffic is illustrated in FIG. 1. In the illustrated embodiment, a query traffic director 120 is configured to direct query traffic received from one or more query requesters among a plurality of query servers 130*a-b*. Each query server 130*a-b* is coupled to respective data storage device 140*a-b*. It is contemplated that in various embodiments, an arbitrary number of query servers 130 may be provided, and each query server 130 may be coupled to more than one data storage device 140. It is also contemplated that in some embodiments, a data storage device 140 may be included within a query server 130.

In one embodiment, query servers 130 may be configured as general purpose server computers configured to execute an operating system as well as to execute database software in an application environment provided by the operating system. Query servers 130 may be based on any suitable processor architecture, such as Intel x86, Intel Itanium, Sun SPARC, IBM Power or PowerPC, for example. Query servers 130 may run any suitable operating system, such as a version of Microsoft Windows, Linux, or Unix, for example. In various embodiments, query servers 130 may execute database software provided by or compatible with Oracle, Sybase, or Informix database software, or any other database vendor. Query server 130 may be configured to store database data in any suitable data format, such as a tabular format or an XML-tagged format, for example. Additionally, query server 130 may be configured to interpret and evaluate queries formulated in any suitable query language, such as SQL, MySQL, or XQuery, for example. It is contemplated that in some embodiments, query servers 130 may be configured to query data stored on data storage devices 140 as file system content, where file system content may include data stored in individual files or metadata associated with individual files. That is, the data available for querying may not be restrained in scope to a namespace defined by a database application, but instead may encompass any file system content including data and program files (and their metadata) corresponding to other applications and uses.

Data storage devices 140 may be any storage devices suitable for storing database data, such as magnetic or optical media devices. In some embodiments, storage devices 140 may be individual hard disk drives coupled to a respective query server 130, such as through a Small Computer System Interface (SCSI) or AT Attachment Peripheral Interface (ATAPI). In other embodiments, a storage device 140 may be configured as a standalone disk array coupled to a respective query server 130 via a Local Area Network (LAN) interface, such as Ethernet, for example, or a Storage Area Network (SAN) interface, such as Fibre Channel, for example. Numerous other types and configurations of data storage devices 140 are possible and contemplated.

In the illustrated embodiment, query servers 130 may implement a partitioned database as described above, where some datasets of the database are stored on storage devices 140*a* and are accessible via query server 130*a*, and other datasets of the database are stored on storage devices 140*b* and are accessible via query server 130*b*. Query traffic director 120 may be configured to receive a query for evaluation by one or more of query servers 130. In one embodiment, query traffic director 120 may be configured to parse a received query, to identify a dataset targeted by the received query based upon the parsing of the query, and to convey the received query to a particular query server 130 dependent upon the identified dataset.

For example, in one embodiment the database stored by query servers 130 may be configured to store data pertaining to auctions. This database may have several datasets, including "regions", "people", "open_auctions", "closed_auctions", and "categories". The regions dataset may include information regarding each item that is the subject of an auction, regardless of the status of the auction. Additional information regarding each item may be stored in this dataset, such as the name of the item, an item description, a reserve price or minimum bid, etc. The people dataset may include information regarding each person who is a user of the auction system, such as sellers and bidders. More specific information regarding each person may also be stored, such as name, address, and other profile information. The open_auction and closed_auctions datasets may include information about ongoing and closed auctions, respectively. An open_auction record may include information such as a reference to a particular item, a seller, a high bidder, the current bid, the auction end date/time, etc. A closed_auction record may include some information similar to an open_auction record, such as a reference to an item, the auction winner, the closing price of the item, etc. Finally, the categories dataset may include information about what categories exist under which auctions may be listed, as well as information about how categories are related. For example, the categories dataset may include a record of a "cars" category as well as records of "foreign" and "domestic" subcategories of "cars". In one embodiment, the database may be a hierarchical XML database, but in other embodiments it may be implemented using any type of relational database architecture or product.

This example database may be partitioned in one embodiment such that the regions, people and open_auctions datasets are stored on query server 130*a*, while the closed_auctions and categories datasets are stored on query server 130*b*. Depending on the datasets referenced or targeted by a given query, that query may be evaluated by query server 130*a*, 130*b*, or both servers. Generally, the datasets targeted by a given query are those datasets sufficient to satisfy the given query (i.e., to allow that query to be completely evaluated). Those query servers 130 hosting the datasets sufficient to satisfy a given query may be referred to as the target set of query servers 130 for the given query.

As a first example, a query may be generated to select all items in open auctions in the region "asia" for which the seller is user "joe". In one embodiment, such a query may be generated in the XQuery language as follows:

```
for $b in /site/open_auctions/open_auction
let $personid := $b/seller/personref/@person
let $itemid := $b/itemref/@item
where (/site/people/person[@id = $personid]/name = "joe" and
       /site/regions/asia/item[@id = $itemid])
return $b/@id
```

This query iterates on all open auctions listed in the open_auction dataset, selects the seller and item references for each auction, consults the people and regions datasets to respectively identify those cases where the seller is user "joe" and the item is listed in region "asia", and returns those items satisfying these criteria. In this case, the query references only the open_auction, people and region datasets, and so may be evaluated by query server 130*a* which stores those datasets. (It is noted that numerous alternative formulations of this and all other example queries are possible and contemplated. It is further noted that although example queries are shown formulated in XQuery language, in other embodiments any suitable query language may be used, such as SQL, for example.)

As a second example, a query may be generated to count the number of closed auctions where the item sold for a price of ten dollars (or whatever default unit of currency is being used). One XQuery embodiment of this query is:

```
fn:count(/site/closed_auctions/closed_auction
     [price=10])
``` where a count function is used to iterate on the dataset closed_auctions and accumulate the count of those closed auctions having a sales price equal to 10. As this query references only the closed_auctions dataset, it may be evaluated by query server 130*b*.

In a third example, a query may be generated to count the number of closed auctions for which the seller is user "john". One XQuery embodiment of this query is:

```
for $b in /site/closed_auctions/closed_auction
let $personid := $b/seller/@person
where site/people/person[@id = $personid]/name = "john"
return fn:count ($b)
```

This query iterates on all closed auctions listed in the closed_auction dataset, selects the seller reference for each closed auction, consults the people dataset to determine whether the seller reference corresponds to user "john", and returns a count of such auctions. This query references both the people and closed_auction datasets, and so may be evaluated by both query servers 130*a-b*, which respectively store those datasets.

In one embodiment, query traffic director 120 may be configured to detect incoming query traffic, such as the example queries given above. For example, query traffic director 120 may be coupled to a network, such as a LAN, and configured to listen on one or more Transmission Control Protocol (TCP) ports designated for query traffic. In some embodiments, queries may be encapsulated and transmitted according to a protocol such as the Hyptertext Transmission Protocol (HTTP), and query traffic director 120 may be configured to listen for query traffic on well-known or otherwise defined HTTP ports. In other embodiments, query traffic director 120 may be configured to inspect received network traffic to determine whether it includes a query, such as by identifying a flag or other unique characteristic in the payload of a received network packet. Query traffic director 120 may also be configured to perform any additional network packet processing that may be necessary to extract a query payload from a packet, such as packet decryption, checksum computation, or other tasks depending on the network protocols in use.

Once query traffic director 120 determines that a query has been received, it may be configured to parse the query according to the syntax of the query language used in order to identify one or more datasets referenced by the query. In some embodiments, query traffic director 120 may be configured to parse multiple different query languages (such as XQuery and SQL, for example) and may be configured to automatically detect which language applies to a given received query (such as from a packet header, for example). In other embodiments, query traffic director 120 may be configured to parse only a single query language.

In one embodiment, query traffic director 120 may be configured to partially parse a received query until a first dataset referenced by the query is identified, as well as to store information about the mapping of datasets to the various query servers 130. Referring to the first example query given above, in such an embodiment query traffic director 120 may parse the example query until it encounters a reference to dataset open_auctions. Query traffic director 120 may then consult the stored mapping information, determine that query server 130*a* stores dataset open_auctions, and may then convey the received query to query server 130*a* for evaluation without further parsing the query. In such an embodiment, query traffic director 120 may ensure that any given query is first directed to a query server 130 that hosts a dataset relevant to the query, rather than any irrelevant query server 130 that might be chosen by a random or round-robin algorithm, while at the same time incurring minimal processing latency in parsing the query.

In another embodiment, query traffic director 120 may be configured to completely parse a received query. For example, query traffic director 120 may construct a data structure representing a complete parse tree for a query. In such embodiments, query traffic director 120 may be configured to identify each dataset targeted by a received query, and may use this dataset information to select a query server 130 to which to send the query. Where a target set of query servers 130 includes more than one server, in one embodiment query traffic director 120 may use additional information to convey the query to a query server 130 that may be different from the server corresponding to the first dataset encountered during parsing. For example, if a particular query targets datasets stored on both query servers 130*a-b* (such as the third example query above), query traffic director 120 may be configured to determine whether one server is less busy than the other by examining a suitable indication of query server availability. For example, such an indication may include processor utilization, memory utilization, network response time, number of queued requests, or any other indication or combination of indications of query server availability. Query traffic director 120 may then convey the query to the less-busy one of query servers 130*a-b*, which may improve overall query evaluation performance.

In other embodiments, it is contemplated that query traffic director 120 may take other factors into account in determining the query server 130 to which to send a given query. For example, in one embodiment query traffic director 120 may be configured to identify other features or characteristics of the query besides datasets, such as the types and quantities of various query operators used, the depth of traversal of datasets, the use of iteration or nested iteration, or any other syntactic features of the query. As described in greater detail below, various combinations of these features may be used to direct the query. Additionally, other embodiments of query traffic director 120 are contemplated that implement depths of parsing in between the complete and partial schemes just described. For example, rather than stopping after identifying the first dataset targeted by a query or completely parsing the query, one embodiment of query traffic director 120 may stop after identifying the first two or three datasets targeted by a query, or after a certain number of syntactic tokens have been identified, or based on some other criterion.

Where a target set of query servers 130 for a given query includes multiple servers, in some embodiments query traffic director 120 may be configured to select a single query server 130 to which to first direct the query for partial evaluation, such as described above. In such embodiments, query traffic director 120 may also be configured to cause the given query to be conveyed to each query server 130 in the target set in a sequential fashion. For example, in one embodiment query traffic director 120 may convey the identities of those query servers 130 in the target set along with the given query when the given query is conveyed to the first selected server. Alternatively, in one embodiment query traffic director 120 may be configured to convey the given query to each of the query servers 130 in the target set in a parallel (i.e., approximately concurrent) fashion.

Generally speaking, query traffic director 120 is not a query server. That is, query traffic director 120 is configured to direct queries to an appropriate query server 130 based on a partial or complete parsing of those queries, but is not configured to actually evaluate those queries and retrieve corresponding result data. Rather, query traffic director 120 is generally configured to quickly process network traffic including queries and to direct such traffic to an appropriate query server 130 while incurring minimum additional latency.

Figure 2:
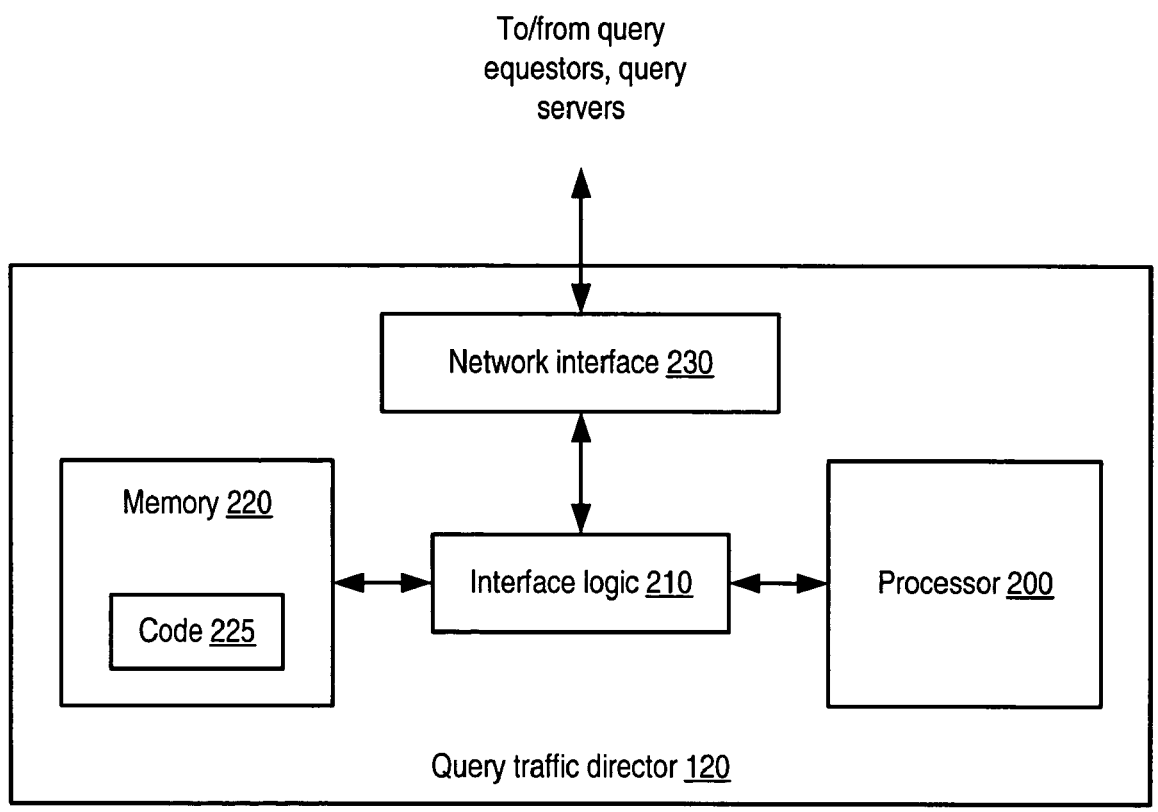
FIG. 2 is a block diagram illustrating one embodiment of a query traffic director.

One embodiment of query traffic director 120 is illustrated in FIG. 2. In the illustrated embodiment, query traffic director 120 includes a processor 200 coupled to a memory 220 and a network interface 230 via interface logic 210. In various embodiments, processor 200 may be a conventional or embedded microprocessor implementing the x86, PowerPC, MIPS, or any other suitable instruction set architecture, or an Application Specific Integrated Circuit (ASIC) or a Field Programmable Gate Array (FPGA) or another type of configurable processing device. As described below, in some embodiments processor 200 may be configured to execute program instructions or directives, stored within memory 220 as code 225, to implement any of the methods or techniques of query traffic director 120 described herein. Also, in some embodiments it is contemplated that query traffic director 120 may employ more than one processor 200, where the multiple processors 200 may be identical, similar or different types of processors.

Memory 220 may be any type of memory storage, such as volatile or nonvolatile Random Access Memory (RAM) in any of its various configurations, Read Only Memory (ROM), or any other suitable memory type. Network interface 230 may be configured to convey data to and from processor 200 or memory 220 and any type of data exchange network, such as a LAN, Wide Area Network (WAN), telecommunications network, wireless network, etc. Interface logic 210 may be any type of logic circuit configured to coordinate the transfer of data and control information among the other devices of query traffic director 120. In some embodiments, it is contemplated that some or all of the functions of each illustrated element of query traffic director 120 may be implemented in a single, highly integrated device such as an ASIC. Also, in some embodiments, it is contemplated that the computational functions performed by query traffic director 120 may be hardwired into logic circuits implemented within processor 200 (such as via a state machine, for example) rather than coded into executable instructions.

As just noted, in some embodiments processor 200 may be configured to execute program instructions and to reference data, thereby performing a computational function. In the illustrated embodiment, such program instructions and/or data are stored as code 225 within memory 220. In some embodiments, memory 220 may be one embodiment of a computer-accessible medium configured to store such program instructions and data. However, in other embodiments, program instructions and/or data may be received, sent or stored upon different types of computer-accessible media. Generally speaking, a computer-accessible medium may include storage media or memory media such as magnetic or optical media, e.g., disk or CD-ROM. A computer-accessible medium may also include volatile or non-volatile media such as RAM (e.g. SDRAM, DDR SDRAM, RDRAM, SRAM, etc.), ROM, etc, such as memory 220. Further, a computer-accessible medium may include transmission media or signals such as electrical, electromagnetic, or digital signals, conveyed via a communication medium such as network and/or a wireless link, which may be accessible via network interface 230.

In one embodiment, query traffic director 120 may be implemented as part of a networking appliance, such as a switch, router, multiplexer, concentrator, or any similar type of standalone networking device. In one such embodiment, code 225 may include an embedded or real-time operating system configured to provide an execution environment for other code, such as code configured to implement the query language parsing, dataset and query server selection, and query routing functions previously described. In another such embodiment, the latter functions may be implemented as a single software process without an operating system execution environment.

In another embodiment, query traffic director 120 may be implemented as part of a general purpose computer system. In one such embodiment, code 225 may include a conventional operating system, such as a version of Windows, Unix or Linux, configured to provide an execution environment for application code. Code 225 may further include software configured to implement the query language parsing, dataset and query server selection, and query routing functions previously described. In some embodiments, query traffic director 120 may be configured to implement these latter functions as privileged or kernel processes of the implemented operating system, in order to improve the performance and stability of the query traffic direction functionality.

As mentioned above, in some embodiments query traffic director 120 may also be configured to perform more sophisticated query traffic direction based on factors in addition to or instead of the datasets corresponding to a given query. For example, in one embodiment a database may not be partitioned among query servers 130, but rather the datasets comprising the database may be commonly stored on storage devices 140, such that any query server 130 may be configured to access any dataset. (In an alternative embodiment, a database may be partially partitioned such that multiple rather than all query servers 130 may be configured to access any given dataset.) In such an embodiment, the target set of query servers 130 for a given query may not depend entirely on the datasets targeted by the query, as multiple servers may be individually capable of satisfying the query.

Correspondingly, in one embodiment query traffic director 120 may be configured to analyze the complexity of a received query and to convey the query to a particular query server 130 dependent upon this analysis. As described above, query traffic director 120 may be configured to identify various features of a query while parsing it, such as the operators used in the query, degree of iteration, etc. In one embodiment, query traffic director 120 may be configured to use these features to estimate the complexity of evaluating the query in terms of processing requirements, memory requirements, or another suitable measure or combination of measures of complexity. For example, query traffic director 120 may estimate that queries including a high degree of nested iteration may require more processing effort than queries including less iteration. Also, query traffic director 120 may estimate that queries that traverse large datasets may require more memory than do more compact queries.

After estimating the complexity of a given query, query traffic director 120 may select an appropriate query server 130 to evaluate the given query. For example, query traffic director 120 may maintain a list of the query servers 130 that have been provisioned, as well as information about the characteristics of each server such as number of processors, processor type, amount of installed memory, etc. Based on the estimated complexity of a query, query traffic director 120 may select a server having more or fewer resources to evaluate the query, which may result in improved server resource utilization and overall query response time. It is contemplated that in some embodiments, query traffic director 120 may also be configured to take into account the current status of query servers 130 when selecting a server based estimated resource requirements. For example, query traffic director 120 may monitor which servers 130 are online or offline, or may track which servers 130 are busy evaluating previous queries, and incorporate this information into the server selection algorithm.

Figure 3:
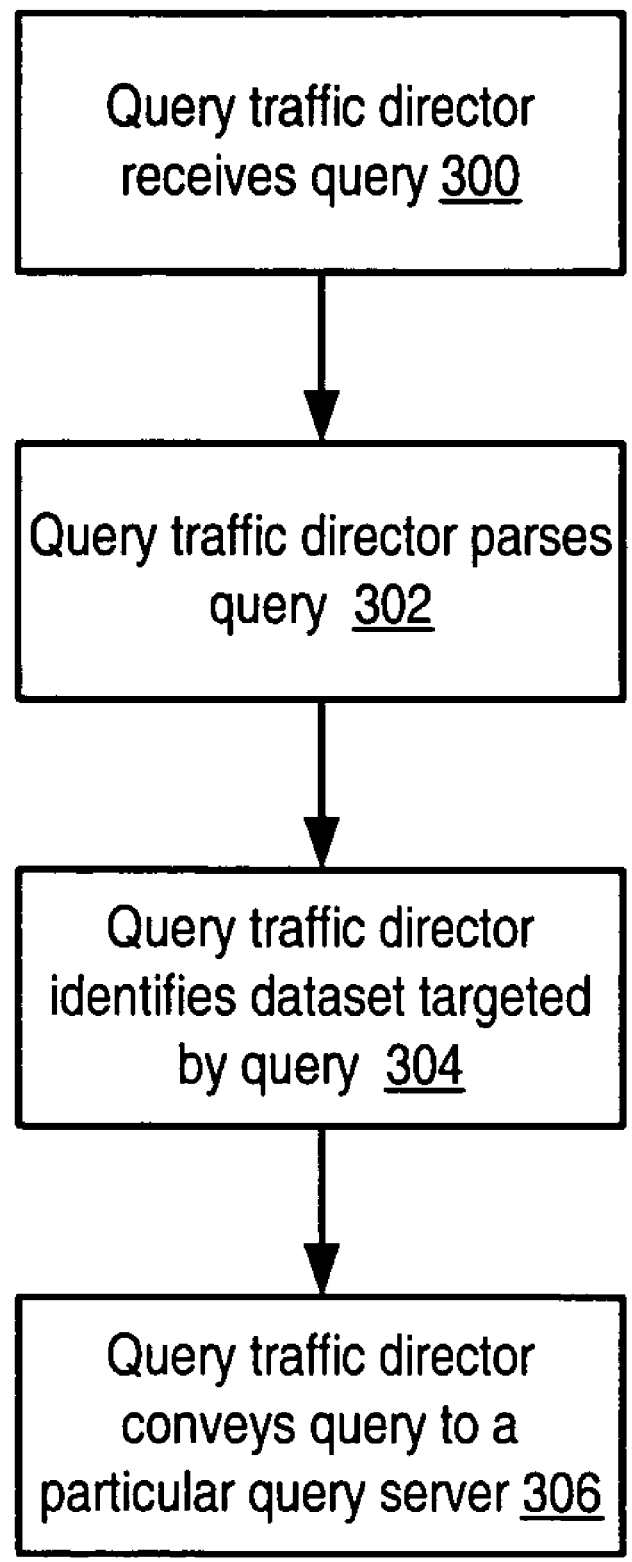
FIG. 3 is a flow diagram illustrating one embodiment of a method of operation of a query traffic director.

One embodiment of a method of operation of query traffic director 120 is illustrated in the flow diagram of FIG. 3. Referring collectively to FIG. 1 through FIG. 3, operation begins in block 300 where query traffic director 120 receives a query for evaluation. For example, the query may be received from a requestor via another computer over a network connection, such as an HTTP port.

Query traffic director 120 may then parse the received query (block 302). As described previously, in various embodiments the query may be completely parsed, or parsing may terminate after one or more datasets have been encountered. Also, in some embodiments query traffic director 120 may also be configured to estimate the complexity of a query while parsing it.

Using the results of the query parsing, query traffic director 120 may identify a dataset targeted by the received query (block 304). Query traffic director 120 may then convey the received query to a particular query server 130 dependent on the identified dataset (block 306). For example, in the case where a database is partitioned such that different datasets map to particular query servers 130, query traffic director 120 may maintain an indication of such a mapping, and use the mapping to select a particular server corresponding to an identified dataset of a query. In some embodiments, as described above, query traffic director 120 may use the estimated complexity of the received query to select a server to which to convey the query for evaluation.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a plurality of query server computers, each configured to evaluate queries directed to one or more datasets of a database; and
   a query traffic director device coupled to the plurality of query server computers, wherein in response to receiving a given query of said queries formulated in a query language for evaluation, the query traffic director device is configured to:
   parse said given query;
   identify a particular one of said datasets targeted by said given query dependent upon parsing said given query;
   identify two or more query server computers of the plurality of query server computers which are coupled for access to the particular one of said datasets, both of the two or more query servers evaluate the given query, wherein a first server of the two or more query server computers is configured with processing resources which provide greater processing performance when evaluating processing intensive computations than a second server of the two or more query server computers, and the second query server computer is configured with memory resources which provide greater performance when evaluating memory intensive computations than the first server;
   determine available resources to evaluate said given query of each of the identified two or more query server computers;
   estimate a computational complexity of evaluating said given query by a query server of the plurality of query servers, in response to receiving the given query, wherein estimating said computational complexity, is configured to use at least one characteristic selected from a group: operators used in the query, degree of iteration, and the size of the particular one of said datasets, and further includes determining a type of computation required to evaluate said given query, said type corresponding to at least one of a first type which is processing intensive, and a second type which is memory intensive;
   select the first server as a selected server to process the given query when the given query corresponds to the first type, and select the second server as the selected server to process the given query when the given query corresponds to the second type; and
   convey said given query to said selected server for evaluation and processing.

2. The system as recited in claim 1, wherein said query traffic director device is further configured to:
   identify multiple datasets of said datasets targeted by said given query dependent upon parsing said given query; and
   identify a target set including two or more query server computers of the plurality of query server computers coupled for access to at least one of the identified multiple datasets.

3. The system as recited in claim 1, wherein said query traffic director device is further configured to select a given one of said query server computers dependent on an indication of availability of said given query server computer.

4. The system as recited in claim 1, wherein said determined available resources comprise at least one of the following: a number of processors, processor type, and amount of installed memory.

5. The system as recited in claim 1, wherein said query traffic director device is further configured to select said particular query server based on at least one of the following: improved query server computer resource utilization and overall query response time.

6. The system as recited in claim 2, wherein said query traffic director device is further configured to cause said given query to be conveyed to each query server computer in said target set in a sequential fashion.

7. A method comprising:
a query traffic director device receiving a given query of queries formulated in a query language for evaluation, wherein said queries are directed to one or more datasets of a database, wherein in response to receiving the given query the query traffic director device:
parsing said given query;
identifying a particular one of said datasets targeted by said given query dependent upon parsing said given query;
identifying two or more query server computers of the plurality of query server computers which are coupled for access to the particular one of said datasets, both of the two or more query servers evaluate the given query, wherein a first server of the two or more query server computers is configured with processing resources which provide greater processing performance when evaluating processing intensive computations than a second server of the two or more query server computers, and the second query server computer is configured with memory resources which provide greater performance when evaluating memory intensive computations than the first server;
determine available resources to evaluate said given query of each of the identified two or more query server computers;
estimate a computational complexity of evaluating said given query by a query server of the plurality of query servers, in response to receiving the given query, wherein estimating said computational complexity, is configured to use at least one characteristic selected from a group: operators used in the query, degree of iteration, and the size of the particular one of said datasets, and further includes determining a type of computation required to evaluate said given query, said type corresponding to at least one of a first type which is processing intensive, and a second type which is memory intensive;
select the first server as a selected server to process the given query when the given query corresponds to the first type, and select the second server as the selected server to process the given query when the given query corresponds to the second type; and
said query traffic director device conveying said given query to said selected server for evaluation and processing.

8. The method as recited in claim 7, further comprising:
said query traffic director device identifying multiple datasets of said datasets targeted by said given query dependent upon parsing said given query; and
said query traffic director device identifying a target set including two or more query server computers of the plurality of query server computers coupled for access to at least one of the identified multiple datasets.

9. The method as recited in claim 7, further comprising said query traffic director device selecting a given one of said query server computers dependent on an indication of availability of said given query server computer.

10. The method as recited in claim 7, further comprising said query traffic director device listening for queries on one or more Hypertext Transfer Protocol (HTTP) ports.

11. The method as recited in claim 7, wherein said particular dataset is stored in a data format compliant with a version of Extensible Markup Language (XML) and wherein said given query is generated in a query language compliant with a version of XML Query (XQuery) language.

12. The method as recited in claim 7, wherein a given one of said query server computers is configured to query file system content including file data stored in one or more or a plurality of files.

13. The method as recited in claim 8, wherein said query traffic director device is further configured to cause said given query to be conveyed to each query server computer in said target set in a sequential fashion.

14. A computer-accessible storage medium storing program instructions, wherein in response to receiving a given query of a plurality of queries formulated in a query language for evaluation, wherein said queries are directed to one or more datasets of a database, the instructions are executed by a query traffic director device to cause the query traffic director device to:
parse said given query;
identify a particular one of said datasets targeted by said given query dependent upon parsing said given query;
identify two or more query server computers of the plurality of query server computers which are coupled for access to the particular one of said datasets, both of the two or more query servers evaluate the given query, wherein a first server of the two or more query server computers is configured with processing resources which provide greater processing performance when evaluating processing intensive computations than a second server of the two or more query server computers, and the second query server computer is configured with memory resources which provide greater performance when evaluating memory intensive computations than the first server;
determine available resources to evaluate said given query of each of the identified two or more query server computers;
estimate a computational complexity of evaluating said given query by a query server of the plurality of query servers, in response to receiving the given query, wherein estimating said computational complexity, is configured to use at least one characteristic selected from a group: operators used in the query, degree of iteration, and the size of the particular one of said datasets, and further includes determining a type of computation required to evaluate said given query, said type corresponding to at least one of a first type which is processing intensive, and a second type which is memory intensive;
select the first server as a selected server to process the given query when the given query corresponds to the first type, and select the second server as the selected server to process the given query when the given query corresponds to the second type; and
convey said given query to said selected server for evaluation and processing.

15. The computer-accessible storage medium as recited in claim 14, wherein the program instructions are further executable to cause said query traffic director device to:
- identify multiple datasets of said datasets targeted by said given query dependent upon parsing said given query; and
- identify a target set including two or more query server computers of the plurality of query server computers coupled for access to at least one of the identified multiple datasets.

16. The computer-accessible storage medium as recited in claim 14, wherein the instructions are further executable to cause said query traffic director device to select a given one of said query server computers dependent on an indication of availability of said given query server computer.

17. The computer-accessible storage medium as recited in claim 14, wherein the instructions are further executable to cause said query traffic director device to listen for queries on one or more Hypertext Transfer Protocol (HTTP) ports.

18. The computer-accessible storage medium as recited in claim 14, wherein said particular dataset is stored in a data format compliant with a version of Extensible Markup Language (XML) and wherein said given query is generated in a query language compliant with a version of XML Query (XQuery) language.

19. The computer-accessible storage medium as recited in claim 14, wherein a given one of said query server computers is configured to query file system content including file data stored in one or more or a plurality of files.

20. The computer-accessible storage medium as recited in claim 15, wherein the instructions are further executable to cause said query traffic director device to convey said given query to each query server computer in said target set in a sequential fashion.

21. The system as recited in claim 1, wherein said query traffic director device is configured to estimate said computational complexity of evaluating said given query by estimating one or more of: an amount of memory required to evaluate said given query, or an amount of processing effort required to evaluate said given query.

22. The method as recited in claim 7, wherein said query traffic director device estimating said computational complexity of evaluating said given query comprises said query traffic director device estimating one or more of: an amount of memory required to evaluate said given query, or an amount of processing effort required to evaluate said given query.

23. The computer-accessible storage medium as recited in claim 14, wherein the instructions are executable to cause said query traffic director device to estimate said computational complexity of evaluating said given query by estimating one or more of: an amount of memory required to evaluate said given query, or an amount of processing effort required to evaluate said given query.

* * * * *